UNITED STATES PATENT OFFICE.

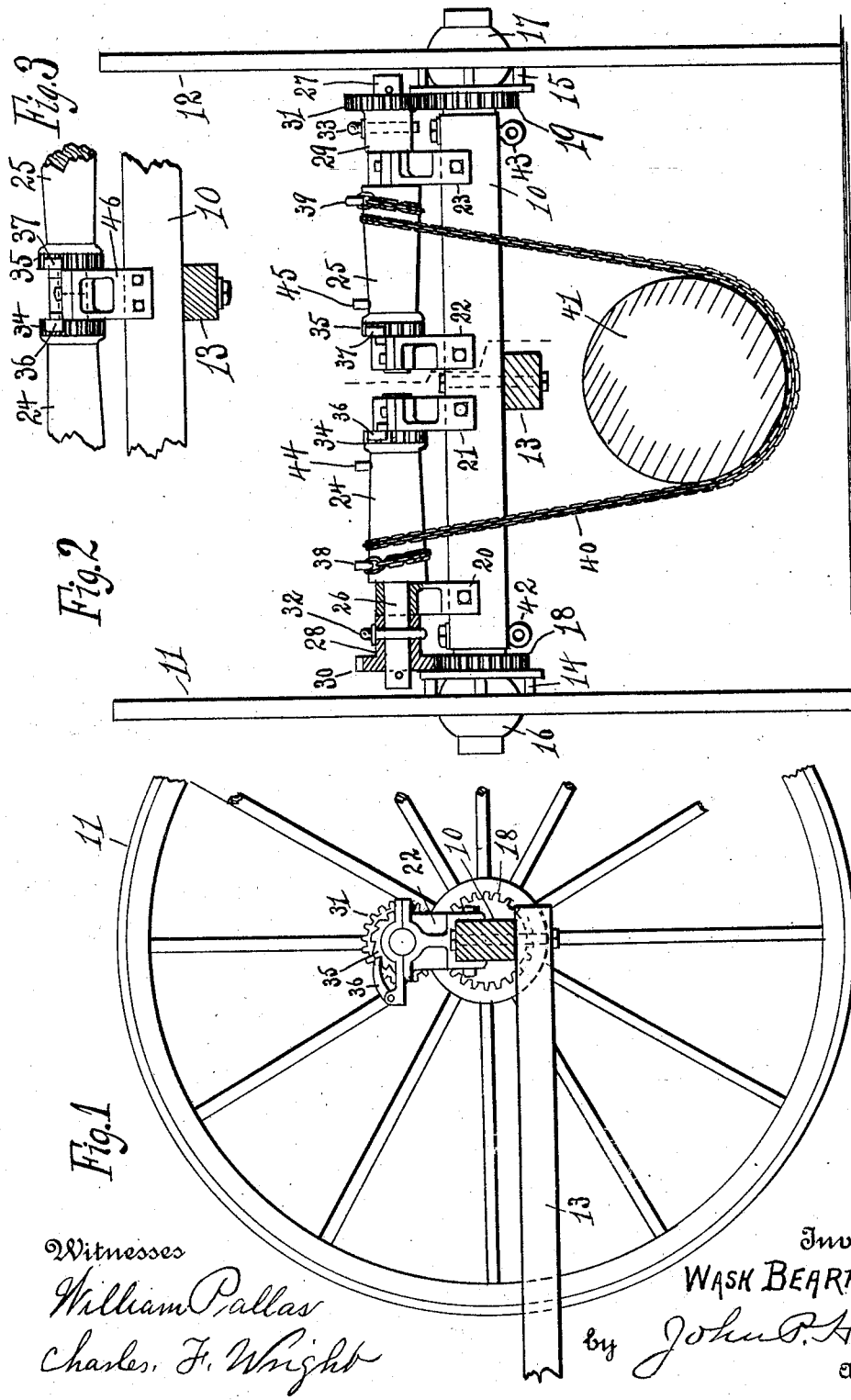

WASH BEARRY, OF ESCATAWPA, ALABAMA.

LOG-HOIST.

No. 823,502.  Specification of Letters Patent.  Patented June 19, 1906.

Application filed August 26, 1905. Serial No. 275,941.

*To all whom it may concern:*

Be it known that I, WASH BEARRY, a citizen of the United States, residing at Escatawpa, in the county of Washington and State of Alabama, have invented certain new and useful Improvements in Log-Hoists, of which the following is a specification.

This invention relates to carts or trucks employed for elevating and carrying logs and like bulky objects or materials, and has for its object to provide a simply-constructed and efficient device whereby the load is automatically elevated by the power imparted by the forward movement of the vehicle.

With this and other objects in view, which will appear as the nature of the invention is better understood, the improvement consists in certain novel features of construction, as hereinafter shown and described.

In the accompanying drawings is shown the embodiment of the invention in practical operation.

In the drawings thus employed, Figure 1 is a sectional elevation of the improved device. Fig. 2 is a front elevation, partly in section. Fig. 3 is a detail view, partly in section, illustrating a slight modification in the construction.

The improved device comprises an axle 10, having bearing-wheels 11 12 at the ends and with a draft-tongue 13 connected to the axle. Attached, as by bolts 14 15, to the inner ends of the hubs 16 17 of the wheels are annular gear-wheels 18 19. Journaled, as by boxes or bearings 20 21 22 23, upon the axle 10 are drums 24 25, the drum 24 having a spindle 26 extending from one end and the drum 25 having a spindle 27 extending from the opposite end. Mounted rotatively upon the spindles are sleeves 28 29, the sleeve 28 having an integral gear 30 for running in constant engagement with the gear 18 on the hub 16 and the sleeve 29 having integral gear 31 running in constant engagement with the gear 19 on the hub 17. The sleeve 28 and spindle 26 are provided with transverse apertures disposed in alinement when the sleeve and spindle are in a certain predetermined position for receiving a locking-pin 32, and the sleeve 29 and spindle 27 are similarly apertured to receive a locking-pin 33. The inner ends of the drums 24 25 are provided, respectively, with integral ratchet-wheels 34 35, with which stop-pawls 36 37, connected to the axle 10 or other suitable portion of the vehicle, engage. Extending radially from the drums 24 25, near their outer ends, are pins 38 39 to receive the opposite ends of a chain 40, designed to be passed beneath the log or other object to be elevated, the latter represented at 41.

By this simple arrangement when a load—for instance, a log—is to be elevated and transported the pins 32 33 are withdrawn, which will release the sleeves 28 29 and their gears 30 31, and then as the vehicle is moved into position above the log the motion of the gears 18 19 will merely rotate the sleeves, but without effect on the drums 24 25. The chain 40 is then passed beneath the log 41 and the end links coupled to the pins 38 39. The pins 32 33 are then restored to couple the sleeves and their gears to the spindles, and as the vehicle is moved forward the motion of the gears 18 19 is transferred to the drums 24 25 and the chain wound thereon and the log elevated. When the log has been elevated to the required height, the pins 32 33 are again removed, when the log can be transported any required distance, the pawls 36 37 holding the drums from rotating backwardly. When the log has reached the required place, the pawls are released and the log permitted to drop, or it can be slowly lowered by again inserting the pins 32 33 through the sleeves and spindles and backing the vehicle with the pawls detached.

By employing two drums and operating them simultaneously two very important results are accomplished. First, the tractive force of both wheels is utilized to accomplish the desired work, and, second, the log is elevated bodily and without rotating the same while moving it upwardly.

The device is simple in construction, can be inexpensively manufactured, and operates effectually for the purpose described.

Provision is also made for employing two chains, and thus handling two logs at once, by arranging eyebolts 42 43 beneath the axle 10 near the ends and also arranging pins 44 45 at the inner ends of the drums 24 25.

In Fig. 3 the inner ends of the drums are journaled in a single bearing 46 instead of upon two bearings, as in Fig. 2; but these slight modifications in the structure are not a departure from the principle of the invention.

Having thus described my invention, what I claim as new, and desire to secure by Letters Patent, is—

In a device of the class described, an axle having bearing-wheels journaled thereon, gear-wheels attached to the hubs of said bearing-wheels, drums spaced apart and mounted for rotation upon said axle and with spindles extending from one end, ratchet-wheels connected to said drums, stop-pawls engaging said ratchet-wheels, sleeves rotative upon said spindles and having gears in constant engagement with the gears on said hubs, said sleeves and spindles having transversely-alined apertures, and pins for detachably engaging said apertures and locking the sleeves to the spindles, and a chain for detachably coupling to said drums.

In testimony whereof I affix my signature in presence of two witnesses.

WASH BEARRY.

Witnesses:
C. E. MOORMAN,
J. H. HAIGHT.